US012359464B2

(12) United States Patent
Piirainen et al.

(10) Patent No.: US 12,359,464 B2
(45) Date of Patent: Jul. 15, 2025

(54) ELECTROMECHANICAL LOCK AND METHOD

(71) Applicant: iLOQ OY, Oulu (FI)

(72) Inventors: Mika Piirainen, Oulu (FI); Väinö Tikkanen, Oulu (FI)

(73) Assignee: Iloq Oy, Oulu (FI)

( * ) Notice: Subject to any disclaimer, the term of this patent is extended or adjusted under 35 U.S.C. 154(b) by 343 days.

(21) Appl. No.: 17/861,315

(22) Filed: Jul. 11, 2022

(65) Prior Publication Data

US 2022/0341218 A1 Oct. 27, 2022

Related U.S. Application Data

(63) Continuation-in-part of application No. 17/205,195, filed on Mar. 18, 2021, now Pat. No. 11,414,887, (Continued)

(30) Foreign Application Priority Data

Nov. 20, 2019 (EP) .................................... 19210367

(51) Int. Cl.
*E05B 47/00* (2006.01)
*H01F 7/02* (2006.01)
(Continued)

(52) U.S. Cl.
CPC ...... *E05B 47/0004* (2013.01); *E05B 47/0038* (2013.01); *H01F 7/021* (2013.01);
(Continued)

(58) Field of Classification Search
CPC ............. E05B 47/0004; E05B 47/0038; E05B 47/063; E05B 81/08; E05B 17/22;
(Continued)

(56) References Cited

U.S. PATENT DOCUMENTS 4,078,709 A 3/1978 Jenkins
4,528,534 A 7/1985 Read
(Continued)

FOREIGN PATENT DOCUMENTS

CN 2060011 U * 8/1990
DE 10 2016 205 831 10/2017
(Continued)

OTHER PUBLICATIONS

Dec. 28, 2023 Office Action issued in Korean Patent Application No. 10-2022-7019498, pp. 1-2 [machine translation included].
(Continued)

*Primary Examiner* — Mark A Williams
(74) *Attorney, Agent, or Firm* — Nixon & Vanderhye PC

(57) ABSTRACT

Electromechanical lock and method are disclosed. The lock includes: a movable permanent magnet to move between a first position and a second position; a stationary permanent semi-hard magnet; and an electrically powered magnetization coil positioned adjacent to the stationary permanent semi-hard magnet to switch a polarity of the stationary permanent semi-hard magnet between a first magnetization configuration and a second magnetization configuration. The first magnetization configuration of the stationary permanent semi-hard magnet moves the movable permanent magnet to the first position. The second magnetization configuration of the stationary permanent semi-hard magnet moves the movable permanent magnet to the second position. A magnetic axis of the movable permanent magnet is side by side with a magnetic axis of the stationary permanent semi-hard magnet.

26 Claims, 7 Drawing Sheets

Related U.S. Application Data which is a continuation of application No. PCT/EP2020/082541, filed on Nov. 18, 2020.

(51) Int. Cl.
*H01F 7/06* (2006.01)
*H01F 7/20* (2006.01)

(52) U.S. Cl.
CPC ............... *H01F 7/064* (2013.01); *H01F 7/20* (2013.01); *E05B 2047/0016* (2013.01); *E05B 2047/0036* (2013.01)

(58) Field of Classification Search
CPC .... E05B 47/026; H01F 7/1607; H01F 7/1615; H01F 7/124; H01F 2007/1692; H01F 7/04; H01F 7/122; H01F 13/00; H01F 7/02; H01F 7/0242; H01F 7/16; H01R 13/6205; E05C 19/166; E05C 19/168
See application file for complete search history.

(56) References Cited

U.S. PATENT DOCUMENTS

| | | | | |
|---|---|---|---|---|
| 5,044,678 | A | 9/1991 | Detweiler | |
| 6,229,421 | B1 | 5/2001 | Floyd | |
| 6,639,496 | B1 | 10/2003 | van Namen | |
| 8,074,961 | B2 | 12/2011 | Clauss | |
| 8,403,124 | B2 | 3/2013 | Dimig | |
| 8,432,242 | B2 | 4/2013 | Irwin | |
| 8,866,349 | B2 * | 10/2014 | Li | H01H 3/28 310/23 |
| 8,912,871 | B2 * | 12/2014 | Lauraire | H01H 3/28 335/229 |
| 8,975,992 | B2 * | 3/2015 | Bottcher | H01F 7/1623 335/229 |
| 10,217,554 | B2 | 2/2019 | Thode | |
| 10,253,528 | B1 | 4/2019 | Pukari | |
| 10,298,037 | B2 * | 5/2019 | Wang | H01R 13/6205 |
| 10,431,363 | B2 * | 10/2019 | Connell | H01F 7/1615 |
| 10,488,173 | B2 * | 11/2019 | Sugawara | H01F 7/16 |
| 10,851,907 | B2 * | 12/2020 | Wardle | H01F 7/081 |
| 10,914,097 | B2 | 2/2021 | Fonteneau | |
| 10,935,151 | B2 | 3/2021 | Schwobe | |
| 2002/0158727 | A1 | 10/2002 | Namen | |
| 2004/0008468 | A1 | 1/2004 | Babich | |
| 2004/0169989 | A1 | 9/2004 | Babich | |
| 2005/0052265 | A1 | 3/2005 | Vladimirescu | |
| 2005/0103926 | A1 | 5/2005 | Hawthome | |
| 2008/0100152 | A1 | 5/2008 | Busch | |
| 2009/0072636 | A1 | 3/2009 | Gruden | |
| 2010/0008009 | A1 | 1/2010 | Cartier-Millon | |
| 2010/0132418 | A1 | 6/2010 | Chen | |
| 2010/0313615 | A1 | 12/2010 | Chen | |
| 2013/0241680 | A1 | 9/2013 | Hanchett | |
| 2016/0040694 | A1 | 2/2016 | Cascolan | |
| 2016/0099095 | A1 | 4/2016 | Fernandes | |
| 2016/0125992 | A1 * | 5/2016 | Irwin | H01F 7/088 335/253 |
| 2016/0153508 | A1 | 6/2016 | Battlogg | |
| 2018/0202189 | A1 * | 7/2018 | Fonteneau | E05B 13/00 |
| 2019/0257118 | A1 * | 8/2019 | Pukari | E05B 47/0038 |
| 2020/0018417 | A1 * | 1/2020 | Ho | F16K 31/0627 |
| 2020/0251853 | A1 * | 8/2020 | Kim | H01R 13/6205 |
| 2020/0392758 | A1 * | 12/2020 | Elsmark | H01F 7/0226 |
| 2021/0207399 | A1 | 7/2021 | Piirainen | |

FOREIGN PATENT DOCUMENTS

| | | |
|---|---|---|
| EP | 3 480 395 | 5/2019 |
| EP | 3 480 396 | 5/2019 |
| EP | 3 118 977 | 6/2019 |
| EP | 3 530 847 | 8/2019 |
| JP | 2005-245047 | 9/2005 |
| JP | 2018-520284 | 7/2018 |
| KR | 20-2010-0000054 | 1/2010 |
| WO | 2004/072418 | 8/2004 |

OTHER PUBLICATIONS

Sep. 30, 2023 Office Action issued in Korean Patent Application No. 10-2022-7019498, pp. 1-5 [machine translation included].
Jun. 13, 2023 Office Action issued in Japanese Patent Application No. 2022-524651, pp. 1-2 [machine translation included].
International Search Report and Written Opinion of the ISA for PCT/EP2020/082541 mailed Feb. 5, 2021, 9 pages.
Search Report for EP19210367 mailed May 7, 2020, 2 pages.

* cited by examiner

ELECTROMECHANICAL LOCK AND METHOD

CROSS-REFERENCE TO THE APPLICATION

This application is a continuation-in-part of U.S. application Ser. No. 17/205,195 filed Mar. 18, 2021, which is a continuation of International Application No. PCT/EP2020/082541 filed Nov. 18, 2020, which claims priority to European Patent Application No. 19210367.9 filed Nov. 20, 2019, the entire contents of each of which are hereby incorporated by reference.

FIELD

Various embodiments relate to an electromechanical lock, and to a method.

BACKGROUND

Some electromechanical locks utilize magnetic field forces to operate mechanics of the lock.

EP 3530847 A1 discloses a digital lock including a semi-hard magnet and a hard magnet. A change in a magnetization polarization of the semi-hard magnet is configured to push or pull the hard magnet to open or close the digital lock. However, as the magnets are placed axially against each other, see FIG. 3 for example, the generated magnetic field forces are relatively small, which complicates a design and implementation of the lock. U.S. Pat. No. 10,298,037 B2 discloses a smart charging system for portable electronic devices, wherein the magnets are also placed axially against each other, see FIG. 2 for example. DE 102016205831 A1 discloses a radio key (of a car remote keyless entry system), which gives tactile feedback to the user by moving a permanent magnet using an electric magnet whose polarity is changed by an electric coil. The permanent magnet and the electric magnet are placed side by side.

BRIEF DESCRIPTION

According to an aspect, there is provided subject matter of independent claims. Dependent claims define some embodiments.

One or more examples of implementations are set forth in more detail in the accompanying drawings and the description of embodiments.

LIST OF DRAWINGS

Some embodiments will now be described with reference to the accompanying drawings, in which FIG. 1A, FIG. 1B, FIG. 1C, FIG. 1D, FIG. 1E and FIG. 1F illustrate embodiments of the electromechanical lock;

Figure 4A:
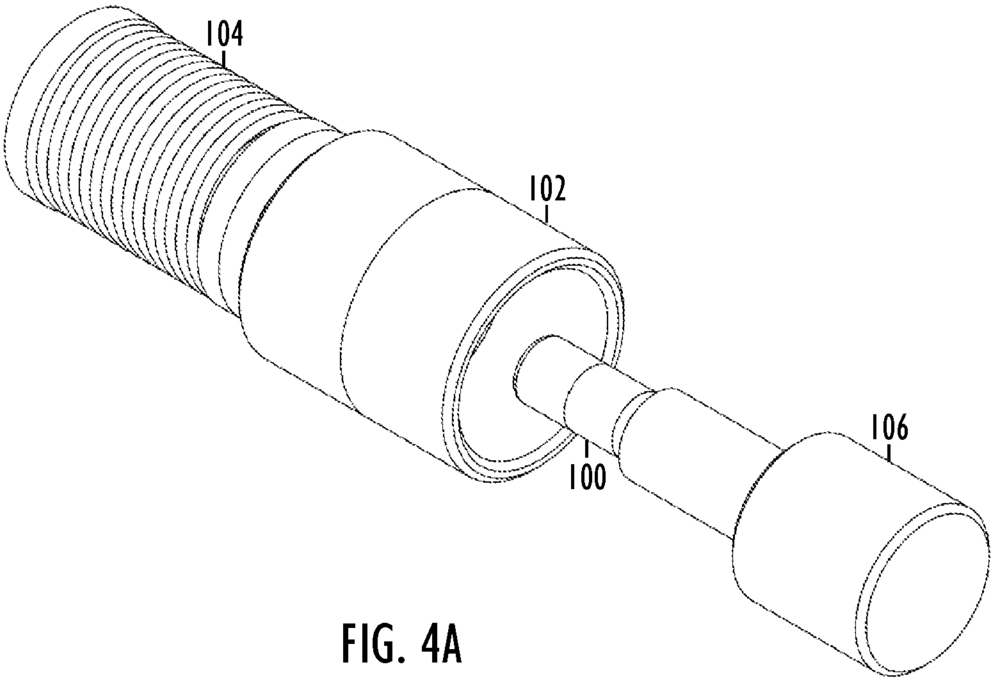
Figure 4B:
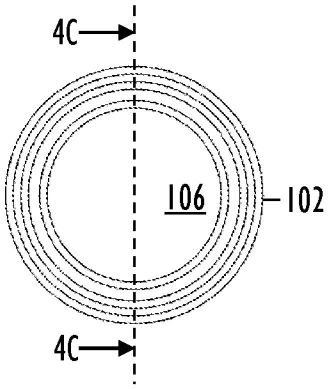
Figure 4C:
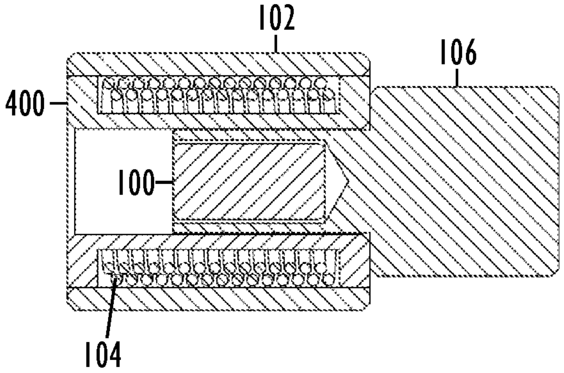
Figure 5A:
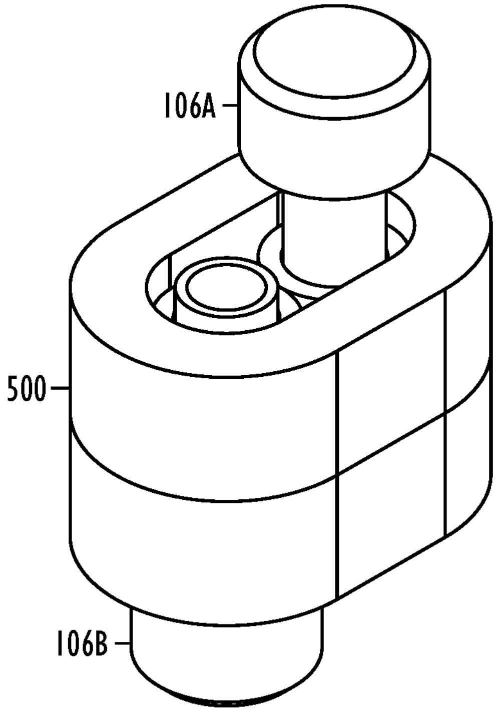
Figure 5B:
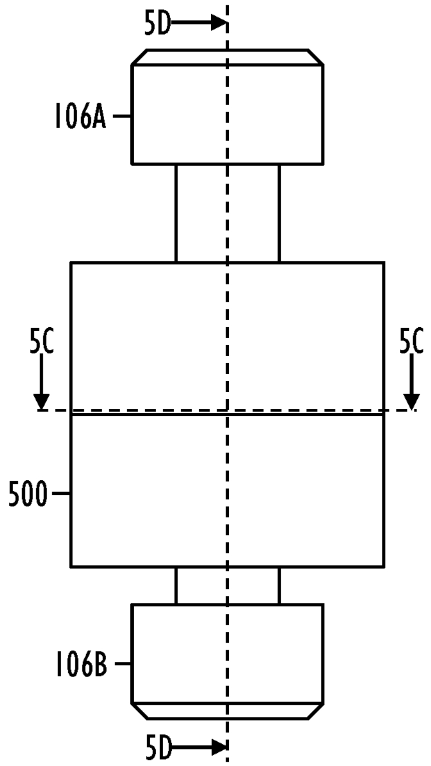
Figure 5C:
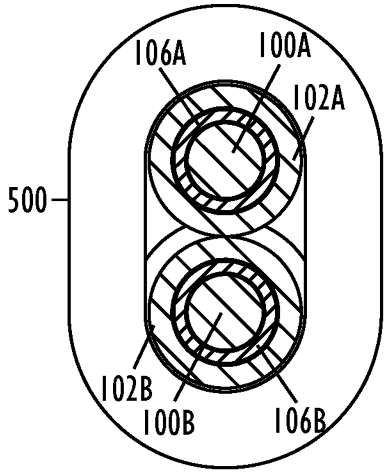
Figure 5D:
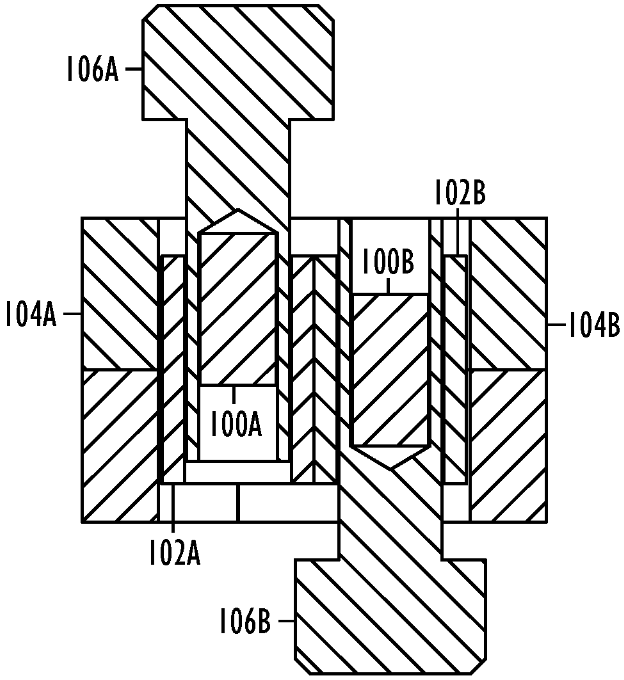
Figure 6:
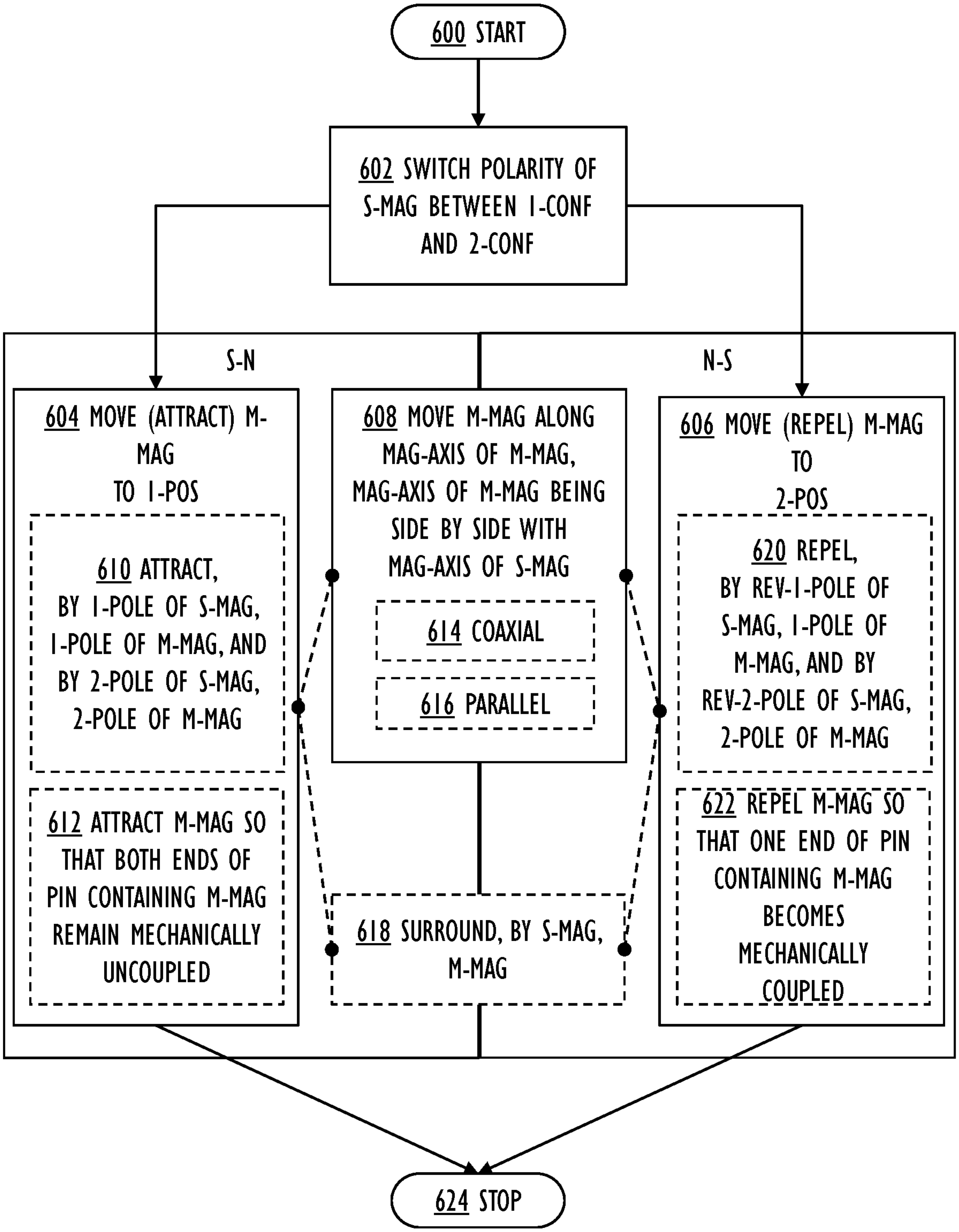
Figure 7:
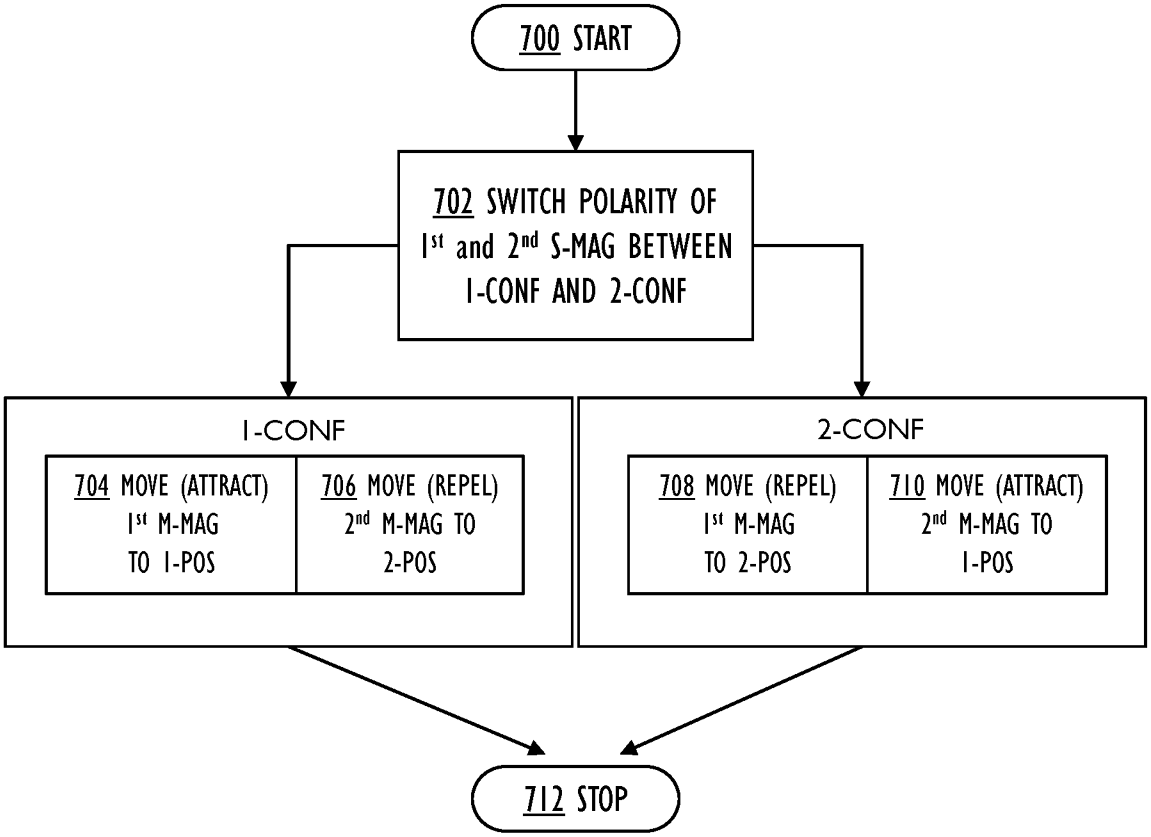

FIG. 4A, FIG. 4B, and FIG. 4C illustrate further embodiments of the electromechanical lock with the stationary permanent semi-hard magnet surrounding a movable permanent magnet and the magnetization coil being positioned in a void between the movable permanent magnet and the stationary permanent semi-hard magnet, and with a case;

FIG. 5A, FIG. 5B, FIG. 5C and FIG. 5D illustrate further embodiments of the electromechanical lock with two moving pins; and FIG. 6 and FIG. 7 are flow charts illustrating embodiments of a method.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Reference numbers, both in the description of the embodiments and in the claims, serve to illustrate the embodiments with reference to the drawings, without limiting it to these examples only.

The embodiments and features, if any, disclosed in the following description that do not fall under the scope of the independent claims are to be interpreted as examples useful for understanding various embodiments of the invention.

The applicant, iLOQ Oy, has invented many improvements for the electromechanical locks, such as those disclosed in various European and US patent applications and patents, incorporated herein as references in all jurisdictions where applicable. A complete discussion of all those details is not repeated here, but the reader is advised to consult those publications.

Let us now turn to FIG. 1A, FIG. 1B, FIG. 1C, FIG. 1D, FIG. 1E and FIG. 1F, which illustrate embodiments of an electromechanical lock, but with only such parts shown that are relevant to the present embodiments.

The electromechanical lock comprises a movable permanent magnet 100 to move between a first position 120 and a second position 140, a stationary permanent semi-hard magnet 102, and an electrically powered magnetization coil 104 positioned adjacent to the stationary permanent semi-hard magnet 102.

The magnets 100, 102 are "permanent", i.e., they are made from a material that is magnetized and creates its own persistent magnetic field. Permanent magnets are made from magnetically "hard" materials (like ferrite) that are processed in a strong magnetic field during manufacture to align their internal microcrystalline structure, which makes them very hard to demagnetize. Magnetically "soft" materials (like annealed iron) can be magnetized but do not tend to stay magnetized. To demagnetize a saturated magnet, a magnetic field with an intensity above a coercivity of the material of the magnet is applied. Magnetically "hard" materials have a high coercivity, whereas magnetically "soft" materials have a low coercivity. Magnetically "semi-hard" materials include alloys whose coercivity is between the "soft" magnetic materials and "hard" magnetic materials.

In an embodiment, the movable permanent magnet 100 is made of "magnetically" hard material. In an embodiment, the movable permanent magnet 100 is an SmCo (samariumcobalt alloy) magnet, whose coercivity is 40-2800 kA/m (and typically between 400-2800 kA/m).

In an embodiment, the stationary permanent semi-hard magnet 102 is an AlNiCo (aluminum-nickel-cobalt alloy) magnet, whose coercivity is typically between 30-150 kA/m.

Note that according to some classifications, the AlNiCo magnet is counted as a hard magnet, but in this application, the semi-hard magnet is such magnet that is not too soft, so that it easily becomes demagnetized, but not too hard either, so that its polarity may be reversed with the electrically powered magnetization coil 104 using an appropriate current.

Figure 1A:
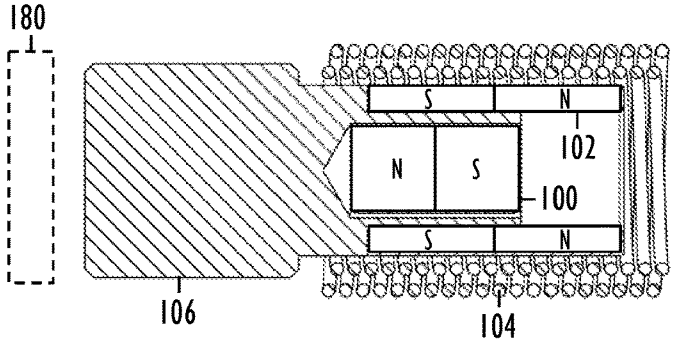
Figure 1B:
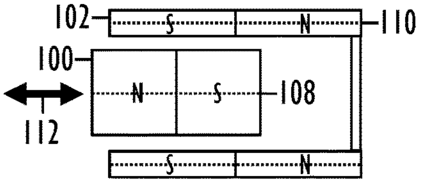
Figure 1C:
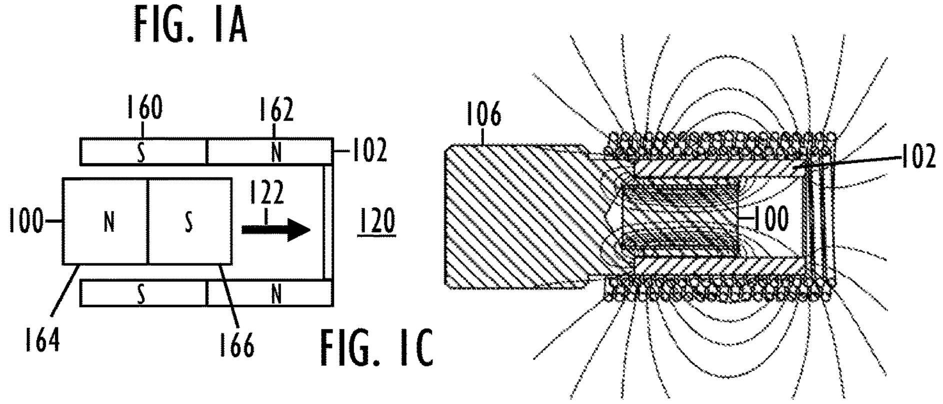
Figure 1D:
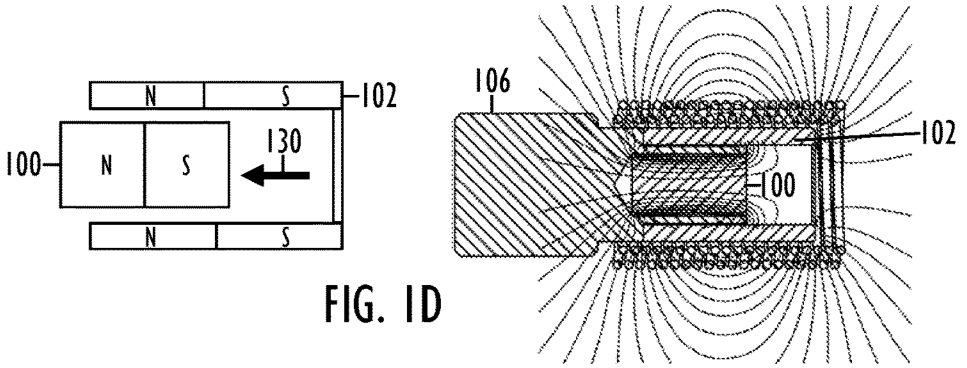
Figure 1E:
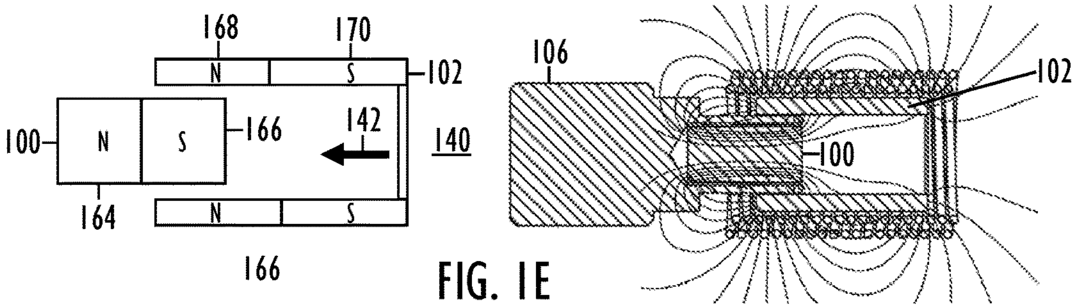

The electrically powered magnetization coil 104 switches a polarity of the stationary permanent semi-hard magnet 102 between a first magnetization configuration S-N as shown in FIG. 1C and a second magnetization configuration N-S as shown in FIG. 1E. In an embodiment, the electrically powered magnetization coil 104 operates so that a flow of electricity in one direction causes the first magnetization configuration S-N, and a flow of the electricity in an opposite direction causes the second magnetization configuration N-S.

The electrically powered magnetization coil 104 may be a part of a magnetizer (not illustrated in Figures). The magnetizer generates a very short pulse of a very high electric current, which causes a brief but very strong magnetic field. The electric pulse may be caused by storing up electric current in a bank of capacitors at high voltage and then suddenly discharging the capacitors through an electronic switch. The electric pulse is applied to the electrically powered magnetization coil 104, which may be at its simplest form a coil of wire.

In an embodiment, a single electric pulse having a flow of electricity in one direction causes the first magnetization configuration S-N, and a single electric pulse having a flow of the electricity in an opposite direction causes the second magnetization configuration N-S.

In an embodiment, a plurality of consecutive electric pulses having a flow of electricity in one direction causes the first magnetization configuration S-N, and a plurality of consecutive electric pulses having a flow of the electricity in an opposite direction causes the second magnetization configuration N-S. By having two ore more magnetization pulses, the resulting magnetic field of the stationary permanent semi-hard magnet 102 becomes stronger than with a single magnetization pulse.

In an embodiment, the electrically powered magnetization coil 104 consists of a single coil.

In an embodiment, the electrically powered magnetization coil comprises a plurality of coils. For example, besides a main coil, an additional shorter coil is wound around the main coil. The additional coil first generates an initial magnetization pulse, followed by a main magnetization pulse generated by the main coil.

In an embodiment, the electric energy may be harvested by the electromechanical lock using Near Field Communication NFC from a smartphone or other user apparatus, or the current may be generated from a key insertion, both being technologies developed by the applicant. However, other sources of electric energy may be applied as well.

Note that the first magnetization configuration S-N, and the second magnetization configuration N-S may also be the other way round: the first magnetization configuration N-S, and the second magnetization configuration S-N, in which case the poles 164, 166 (N-S) of the movable permanent magnet 100 are the other way round (S-N).

Note also that although the magnets 100, 102 are referred to in a singular form, i.e., as consisting of one magnet each, they may each consists of a plurality of magnets, configured and positioned so that they repel 122 and attract 142 as described.

The magnetic pole model has the following pole naming conventions: the North pole N and the South pole S. The opposite poles (S-N) attract each other, whereas similar poles (N-N or S-S) repel each other. Even though magnetism is a far more complex physical phenomenon (which, besides magnetic poles, may also be modelled with atomic currents), the magnetic pole model enables one to understand the way the magnets 100, 102 operate in the embodiments. A magnetic axis may be defined as a straight line joining two opposite poles (S and N) of a magnet.

The stationary permanent semi-hard magnet is provided to move the movable permanent magnet to the first and/or the second positions depending on the magnetization configuration. This movement is based on the above mentioned attracting and repelling of the poles. Later an embodiment is described such that the movable magnet is attracted to the first position and repelled to the second position, but it may also be the other way around such that the moveable magnet is repelled to the first position and attracted to the second position.

In addition, the electromechanical lock may comprise a first and a second stationary permanent semi-hard magnets wherein the first stationary permanent semi-hard magnet is configured to move a first movable permanent magnet, and the second stationary permanent semi-hard magnet is configured to move a second movable permanent magnet between the first and the second positions. The first and the second movable permanent magnet may be attracted or repelled to the first position, and attracted or repelled to the second position. It may also be possible that the first movable permanent magnet is attracted to the first position and the second movable permanent magnet is repelled to the first position, or vice versa. It may also be possible that the first movable permanent magnet is attracted to the second position and the second movable permanent magnet is repelled to the second position, or vice versa.

As described above, the invention may be implemented in many ways by using the magnetic poles to move the movable magnets.

The first magnetization configuration S-N of the stationary permanent semi-hard magnet 102 attracts 122 the movable permanent magnet 100 to the first position 120. In an embodiment shown in FIG. 1C, in the first magnetization configuration S-N, a first pole 160 (at a first end) of the stationary permanent semi-hard magnet 102 attracts a first pole 164 (at a first end) of the movable permanent magnet 100, and a second pole 162 (at a second end) of the stationary permanent semi-hard magnet 102 attracts a second pole 166 (at a second end) of the movable permanent magnet 100. The second magnetization configuration N-S of the stationary permanent semi-hard magnet 102 repels 142 the movable permanent magnet to the second position 140. In an embodiment shown in FIG. 1E, in the second magnetization configuration N-S, a reversed first pole 168 (at the first end) of the stationary permanent semi-hard magnet 102 repels the first pole 164 (at the first end) of the movable permanent magnet 100, and a reversed second pole 170 (at the second end) of the stationary permanent semi-hard magnet 102 repels the second pole 166 (at the second end) of the movable permanent magnet 100.

Figure 1F:
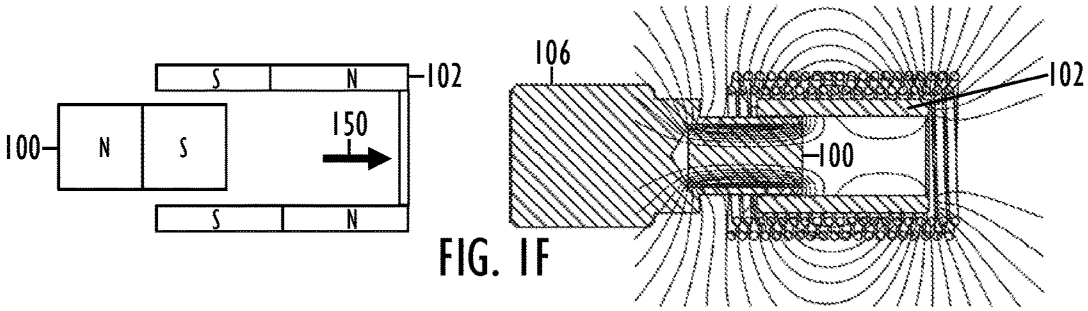

Note that FIG. 1C, FIG. 1D, FIG. 1E and FIG. 1F illustrate a motion sequence (the left-hand side illustrating the magnets in detail, and the right-hand side illustrating a simulation of the magnetic fields):

in FIG. 1C, the first magnetization configuration S-N attracts 122 the movable permanent magnet 100 to the first position 120;

in FIG. 1D, the second magnetization configuration N-S has started to repel 130 the movable permanent magnet 100;

in FIG. 1E, the second magnetization configuration N-S repels 142 the movable permanent magnet 100 to the second position 140; and in FIG. 1F, the first magnetization configuration S-N has started to attract 150 the movable permanent magnet 100.

As shown in FIG. 1B, a magnetic axis 108 of the movable permanent magnet 100 is side by side with a magnetic axis 110 of the stationary permanent semi-hard magnet 102.

In an embodiment, the magnetic axis 108 of the movable permanent magnet 100 is coaxial with the magnetic axis 110 of the stationary permanent semi-hard magnet 102. This means that the two axes 108, 110 share a common axis or the same center (whereby the two axes are concentric).

In an embodiment, in the movable permanent magnet 100 moves between the first position 120 and the second position 140 along a motion axis 112 that is parallel with both the magnetic axis 108 of the movable permanent magnet 100 and the magnetic axis 110 of the stationary permanent semi-hard magnet 102.

It may also be said that in an embodiment, the magnetic axis 108 of the movable permanent magnet 100 is paraxially side by side with the magnetic axis 110 of the stationary permanent semi-hard magnet 102. This means that the two axes 108, 110 are placed parallel and side by side.

Let us next study various embodiments of the electromechanical lock.

First, let us consider functions for which the described structure with the magnets 100, 102 and the coil 104 may be utilized in the electromechanical lock: for coupling and uncoupling, and for enabling and disabling, for example. The coupling/uncoupling and/or the enabling/disabling may set the electromechanical lock to a locked state, may let the electromechanical lock to remain in a locked state, or may change the electromechanical lock to an openable state.

In an embodiment, the first position 120 of the movable permanent magnet 100 keeps an engagement in the electromechanical lock uncoupled, whereby the electromechanical lock remains in a locked state, whereas the second position 140 of the movable permanent magnet 100 makes the engagement in the electromechanical lock coupled, whereby the electromechanical lock changes to an openable state.

In an embodiment, the first position 120 of the movable permanent magnet 100 blocks a movement in the electromechanical lock, whereby the electromechanical lock remains in a locked state, whereas the second position 140 of the movable permanent magnet 100 enables the movement in the electromechanical lock, whereby the electromechanical lock changes to an openable state.

The two above-mentioned embodiments are not described in this application, but the reader is advised to consult other applications and patents of the applicant, such as EP 3118977 B1, EP 3480396 A1 and EP 3480395 A1, incorporated herein as references in all jurisdictions where applicable. The present embodiments may be applied to the mechanical structures described in those patents, as well as to the mechanical structures described in the earlier-mentioned EP 3530847 A1.

FIG. 5A, FIG. 5B, FIG. 5C and FIG. 5D illustrate further embodiments of the electromechanical lock with two moving pins 106A, 106B in a same case 500. The one pin 106A may be used to engage/disengage the engagement, whereas the other pin 106B may be used to block/enable the movement, for example. Each pin 106A, 106B houses the moving permanent magnet 100A, 100B, which interacts with the stationary permanent semi-hard magnets 102A, 102B. The electrically powered magnetization coils 104A, 104B may be placed as in the embodiments described with reference to FIG. 2A-FIG. 2E and FIG. 3A-FIG. 3E, or as in the embodiments described with reference to FIG. 4A-FIG. 4C. The electrically powered magnetization coils 104A, 104B may be connected in series so that the electric pulse causes similar (S-N and S-N, or N-S and N-S) or different (S-N and N-S, or N-S and S-N) magnetization configurations to each stationary permanent semi-hard magnet 102A, 102B. With this kind of operation, both pins 106A, 106B move simultaneously with just one control cycle. Naturally, if the electrically powered magnetization coils 104A, 104B are not connected in series, then each pin 106A, 106B may be controlled separately, independently of the operation and timing of each other.

Another kind of configuration (not illustrated) may be such that two (or more) movable permanent magnets 100 are fixed to a single pin 106, surrounded by two (or more) stationary permanent semi-hard magnets 102, which are magnetized with one or two electrically powered magnetization coils 104A, 104B. In this way, the magnetic forces that move the pin 106 are greater than with single magnets 100, 102.

Various configurations may be combined so that one, two, three, or more mechanical elements, such as pins, may be magnetically controlled as described.

In an embodiment shown in FIG. 1A, the stationary permanent semi-hard magnet 102 is formed and positioned to surround the movable permanent magnet 100 in the first position 120 and in the second position 140. In FIG. 1A, the stationary permanent semi-hard magnet 102 completely surrounds the movable permanent magnet 100, but such an embodiment is also feasible wherein the stationary permanent semi-hard magnet 102 partly surrounds the movable permanent magnet 100.

In an embodiment shown in FIG. 1A, the stationary permanent semi-hard magnet 102 is of a tubular shape, and the movable permanent magnet 100 is placed inside a hollow in a pin 106. A part of the pin 106 containing the movable permanent magnet 100 may be clearance fitted and positioned to move in the tubular shape of the stationary permanent semi-hard magnet 102.

In an embodiment, the pin 106 is made of titanium, stainless steel, or other non-magnetic material having a sufficient breaking strength.

In an embodiment, the movable permanent magnet 100 is 2 mm long, and the stationary permanent semi-hard magnet 102 is 3 mm long. A diameter of the hollow inside the tubular shape is 1.4 mm, and a diameter of the movable permanent magnet 100 is 1 mm, whereby the pin 106 provides a little less than a 0.2 mm coating for the movable permanent magnet 100. Note that these measures are examples only, but they serve to illustrate the fact that with the described positioning of the magnets 100, 102 side by side, the magnetic forces are much greater than if placed axially against each other (as in the prior art), whereby design and implementation of the electromechanical lock becomes easier (as regards to security, size, mechanical complexity, and electrical efficiency in self-powered locks, for example).

In an embodiment, the first magnetization configuration S-N of the stationary permanent semi-hard magnet 102 attracts the movable permanent magnet 100 to the first position 120 so that both ends of the pin 106 remain mechanically uncoupled, whereby the electromechanical lock remains in a locked state, whereas the second magnetization configuration N-S of the stationary permanent semi-hard magnet 102 repels the movable permanent magnet 100 to the second position 140 so that, at least, one end of the pin 106 becomes mechanically coupled, whereby the electromechanical lock changes to an openable state. This is illustrated in FIG. 1A: the left-hand broadened part of the pin 106 remains first uncoupled with a cavity 180, and also the right-hand part (containing the South pole) of the pin 106 remains uncoupled, but after the magnetization configuration of the stationary permanent semi-hard magnet 102 is switched from S-N to N-S (i.e., from FIG. 1C to FIG. 1E), the left-hand broadened part of the pin 160 becomes mechanically coupled with the cavity 180.

Figure 2A:
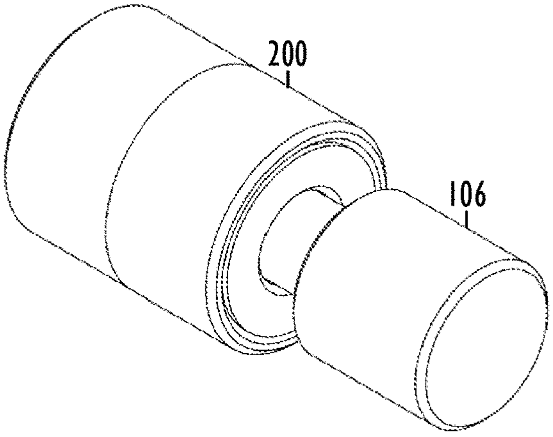
FIG. 2A, FIG. 2B, FIG. 2C, FIG. 2D and FIG. 2E illustrate further embodiments of the electromechanical lock with a magnetization coil surrounding a stationary permanent semi-hard magnet, and with a case.
Figure 2B:
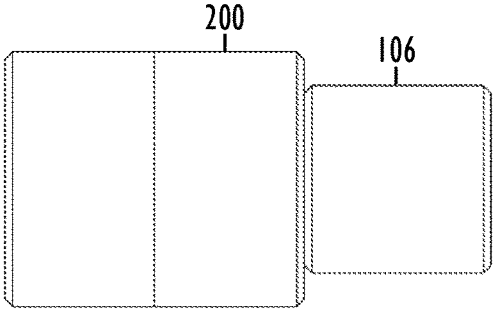
Figure 2C:
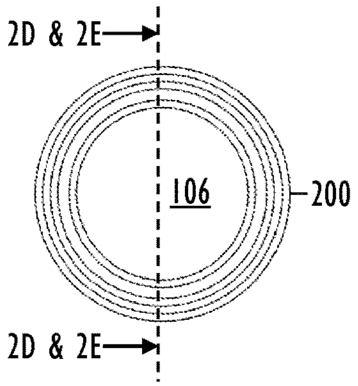
Figure 2D:
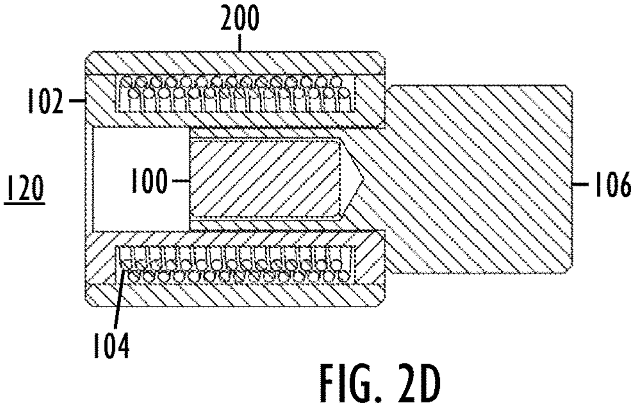
Figure 2E:
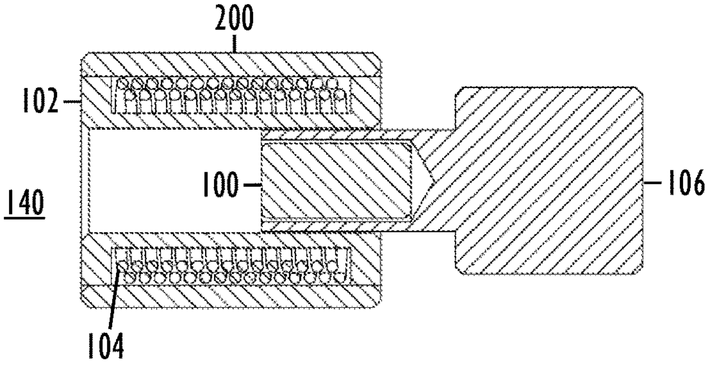
Figure 3A:
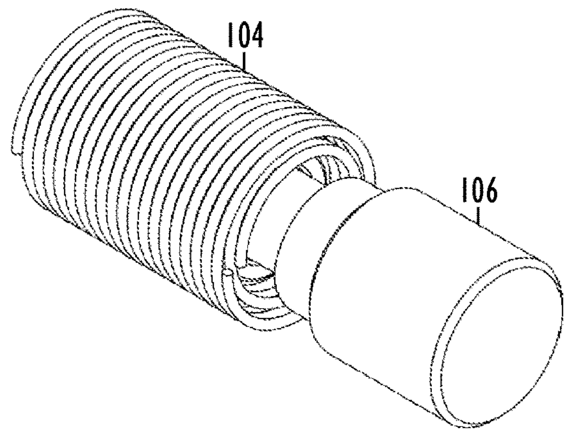
FIG. 3A, FIG. 3B, FIG. 3C, FIG. 3D and FIG. 3E illustrate further embodiments of the electromechanical lock with the magnetization coil surrounding the stationary permanent semi-hard magnet, but without the case.
Figure 3C:
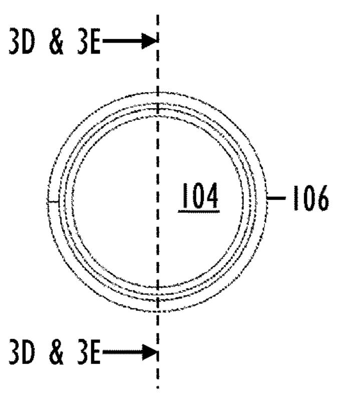
Figure 3B:
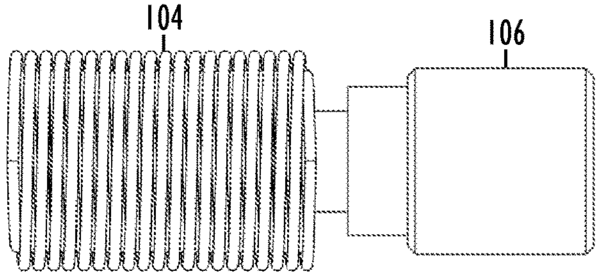
Figure 3D:
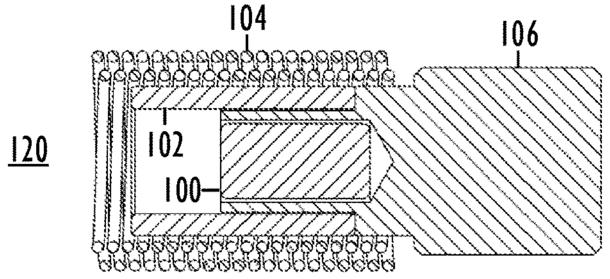
Figure 3E:
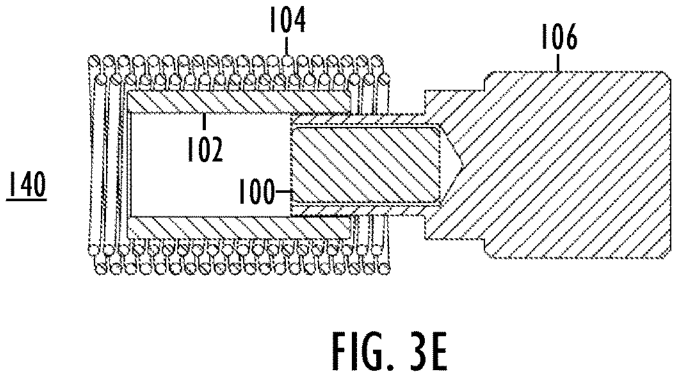

It is important to realize that the term "mechanically uncoupled" in this example refers to the situation in which the pin 106 is not coupled with the cavity (counterpart for pin) 180. The pin may be in connection inside the lock with some mechanical part(s) but not with the cavity. For example, the pin may be in connection with the stationary semihard magnet 102 in the uncoupled state as illustrated in FIG. 2D. The term "mechanically coupled" in this example refers to the situation in which the pin 106 is coupled with the cavity (counterpart) 180 and the end of the pin may be against a bottom of the cavity.

In an embodiment, the electromechanical lock comprises a first moving pin 106A and a second moving pin 106B. As described above, the first pin 106A may be used to engage/disengage the engagement, whereas the second pin 106B may be used to block/enable the movement, for example. The first pin 106A may be a clutch pin configured to transfer rotational movement of a keyway in the lock, and the second pin 106B may a locking pin configured to block/unblock the rotational movement of the keyway in the lock, for example.

Referring to FIG. 5D, in this embodiment the electromechanical lock comprises a first and a second cylindrically shaped stationary permanent magnets 102A, 102B, a first movable permanent magnet 100A placed inside a hollow of the first pin 106A, and a second movable permanent magnet 100B placed inside a hollow of the second pin 106B. At least a part of the first pin 106A containing the first movable permanent magnet 100A is controllable to move in the cylindrical shape of the first stationary permanent semi-hard magnet 102A, and at least a part of the second pin 106B containing the second movable permanent magnet 100B is controllable to move in the cylindrical shape of the second stationary permanent semi-hard magnet 102B.

In an embodiment, the first magnetization configuration S-N of the first and the second stationary permanent semi-hard magnet 102A, 102B is arranged to move the first movable permanent magnet 100A to the first position 120 so that both ends of the first pin 106A remain mechanically uncoupled, and to move the second movable permanent magnet 100B to the second position 140 so that one end of the second pin 106B becomes mechanically coupled so that the electromechanical lock remains in the locked state. The second magnetization configuration N-S of the first and the second stationary permanent semi-hard magnet 102A, 102B is arranged to move the first movable permanent magnet 100A to the second position 140 so that one end of the first pin 106A becomes mechanically coupled, and to move the second movable permanent magnet 100B to the first position 120 so that both ends of the second pin 106B remain mechanically uncoupled so as to change the electromechanical lock to the openable state.

Still referring to the embodiment described above, there are two pins that are moved to the opposite positions in the first and the second magnetization configurations. In the first magnetization configuration the first pin 106A is moved to the first position 120, and the second pin 106B is moved to the second position 140 to keep the electromechanical lock in the locked state. As described, the first pin 106A may be configured to engage/disengage the engagement. In the engaged state (the second position 140) the pin may be capable of transferring the rotational movement of the keyway in the lock to set the lock to the open state, and in the disengaged state (the first position 120) the pin may not be capable of transferring the rotational movement and the lock stays in the locked state. The second pin 106B may be configured to block/enable the movement. When the second pin 106B is set to the second position, it may be mechanically coupled with a counterpart to prevent the rotational movement of the keyway, for example. The counterpart may be a cavity 180, as illustrated in FIG. 1A, for example. When the second pin 106B is set to the first position, it may be uncoupled with the counterpart to allow the rotational movement of the keyway. Hence, in the first magnetization configuration, the first pin 106A may be uncoupled (disengaged) such that it is not capable of transferring the rotational movement of the keyway, and the second pin 106B may be coupled with the counter part for preventing the rotational movement of the keyway in the lock. Then the electromechanical lock stays in the locked state since the first pin cannot transfer the rotational movement in the lock, and the second pin further blocks the rotational movement.

In the second magnetization configuration the first pin 106A is moved to the second position 140, and the second pin 106B is moved to the first position 140 to set the electromechanical lock to the openable state. Then the first pin is in the engaged state enabling transfer of the rotational movement of the keyway in the lock, and the second pin is uncoupled allowing the rotational movement of the keyway making possible to set the electromechanical lock to the openable state. In an embodiment, the electromechanical lock comprises a first and a second magnetization coil 104A, 104B. The first magnetization coil 104A is configured to change the polarity of the first stationary permanent semi-hard magnet 102A to cause the first pin 106A to move and hold its new position in a new magnetic field constellation created by the changed polarity. The second magnetization coil 104B is configured to change the polarity of the second stationary permanent semi-hard magnet 102B to cause the second pin 106B to move and hold its new position in a new magnetic field constellation created by the changed polarity.

In an embodiment shown in FIG. 2A, FIG. 2B, FIG. 2C, FIG. 2D, FIG. 2E, FIG. 3A, FIG. 3B, FIG. 3C, FIG. 3D and FIG. 3E, the electrically powered magnetization coil 104 is positioned to surround the stationary permanent semi-hard magnet 102. In an embodiment, the electrically powered magnetization coil 104 is wrapped around the stationary permanent semi-hard magnet 102, and a flow of electricity in one direction causes the first magnetization configuration S-N, and a flow of the electricity in an opposite direction causes the second magnetization configuration N-S.

The difference between FIG. 2A-FIG. 2E and FIG. 3A-FIG. 3E is that in the former the electromechanical lock is shown with an optional case 200, whereas in the latter the case 200 is not needed (as the electromechanical lock is embedded in a space inside a door, for example).

In an embodiment shown in FIG. 4A, FIG. 4B and FIG. 4C, the stationary permanent semi-hard magnet 102 is formed and positioned to surround the movable permanent magnet 100 in the first position 120 and in the second position 140, and the electrically powered magnetization coil 104 is positioned in a void between the movable permanent magnet 100 and the stationary permanent semi-hard magnet 102. In an embodiment, a support structure 400 may be required for electrically powered magnetization coil 104.

Finally, let us study, FIGS. 6 and 7, which are flow charts illustrating embodiments of a method. In an embodiment, the method is performed in an electromechanical lock. In an embodiment, the method is performed in an electromechanical apparatus, which utilizes the described movable permanent magnet 100, the stationary permanent semi-hard magnet 102, and the electrically powered magnetization coil 104.

The operations are not strictly in chronological order, and some of the operations may be performed simultaneously or in an order differing from the given ones. Other functions may also be executed between the operations or within the operations and other data exchanged between the operations. Some of the operations or part of the operations may also be left out or replaced by a corresponding operation or part of the operation. It should be noted that no special order of operations is required, except where necessary due to the logical requirements for the processing order.

Referring to FIG. 6, the method starts in 600.

In 602, a polarity of a stationary permanent semi-hard magnet is switched electrically between a first magnetization configuration and a second magnetization configuration.

In 604, a movable permanent magnet is moved to a first position by the first magnetization configuration of the stationary permanent semi-hard magnet.

In 606, the movable permanent magnet is moved to a second position by the second magnetization configuration of the stationary permanent semi-hard magnet.

In 608, the movable permanent magnet is moved along a magnetic axis of the movable permanent magnet, the magnetic axis of the movable permanent magnet being side by side with a magnetic axis of the stationary permanent semi-hard magnet.

The method ends in 624.

The already described embodiments of the electromechanical lock may be utilized to enhance the method with various further embodiments. For example, various structural and/or operational details may supplement the method.

In an embodiment, the magnetic axis of the movable permanent magnet is coaxial 614 with the magnetic axis of the stationary permanent semi-hard magnet.

In an embodiment, the method further comprises: moving 608 the movable permanent magnet between the first position and the second position along a motion axis that is parallel 616 with both the magnetic axis of the movable permanent magnet and the magnetic axis of the stationary permanent semi-hard magnet.

In an embodiment, the method further comprises: attracting 610, in the first magnetization configuration, by a first pole of the stationary permanent semi-hard magnet, a first pole of the movable permanent magnet, and by a second pole of the stationary permanent semi-hard magnet, a second pole of the movable permanent magnet; and repelling 620, in the second magnetization configuration, by a reversed first pole of the stationary permanent semi-hard magnet, the first pole of the movable permanent magnet, and by a reversed second pole of the stationary permanent semi-hard magnet, the second pole of the movable permanent magnet.

In an embodiment, the method further comprises: surrounding 618, by the stationary permanent semi-hard magnet, the movable permanent magnet in the first position and in the second position.

In an embodiment, the method further comprises: attracting 612, in the first magnetization configuration, the movable permanent magnet to the first position so that both ends of a pin containing the movable permanent magnet remain mechanically uncoupled, and repelling 622, in the second magnetization configuration, the movable permanent magnet to the second position so that one end of the pin becomes mechanically coupled. In an embodiment, due to both ends of the pin containing the movable permanent magnet remaining mechanically uncoupled, the electromechanical lock (executing the method) remains in a locked state, and due to the one end of the pin becoming mechanically coupled, the electromechanical lock changes to an openable state.

Referring to FIG. 7, the method starts in 700.

In 702, polarities of stationary permanent semi-hard magnets are switched electrically between the first magnetization configuration and the second magnetization configuration.

In 704, the first movable permanent magnet is moved to the first position by the first magnetization configuration of the first stationary permanent semi-hard magnet.

In 706, the second movable permanent magnet is moved to the second position by the first magnetization configuration of the second stationary permanent semi-hard magnet.

In 708, the first movable permanent magnet is moved to the second position by the second magnetization configuration of the first stationary permanent semi-hard magnet.

In 710, the second movable permanent magnet is moved to the first position by the second magnetization configuration of the second stationary permanent semi-hard magnet.

The method ends in 712.

In steps 704 and 706 both ends of the first pin containing the first movable permanent magnet are mechanically uncoupled and the one end of the second pin containing the second movable permanent magnet become mechanically coupled, and then the electromechanical lock (executing the method) remains in the locked state (the first magnetization configuration).

In steps 708 and 710 the one end of the first pin containing the first movable permanent magnet become mechanically coupled and both ends of the second pin containing the second movable permanent magnet are mechanically uncoupled, and then the electromechanical lock changes to an openable state (the second magnetization configuration). Hence, the difference between the methods illustrated in FIG. 6 and FIG. 7 is that there are two pins used in the electromechanical lock instead of one in the embodiment of FIG. 7. The same principles are still valid regardless of number of the pins.

Even though the invention has been described with reference to one or more embodiments according to the accompanying drawings, the invention is not restricted thereto but can be modified in several ways within the scope of the appended claims. All words and expressions should be interpreted broadly, and they are intended to illustrate, not to restrict, the embodiments. It will be obvious to a person skilled in the art that, as technology advances, the inventive concept can be implemented in various ways.

What is claimed is:

1. An electromechanical lock comprising:

at least one movable permanent hard magnet configured to move between first and second positions;

at least one stationary permanent semi-hard magnet; and at least one electrically powered magnetization coil positioned to surround the stationary permanent semi-hard magnet and configured to switch a polarity of the at least one stationary permanent semi-hard magnet between first and second magnetization configurations, wherein the first magnetization configuration of the at least one stationary permanent semi-hard magnet is provided to at least move the at least one movable permanent magnet to the first position, and the second magnetization configuration of the at least one stationary permanent semi-hard magnet is provided to at least move the at least one movable permanent magnet to the second position;

wherein the at least one stationary permanent semi-hard magnet has a tubular shape, and the at least one movable permanent magnet is placed inside a hollow in a pin, wherein a part of the pin containing the at least one movable permanent magnet is clearance fitted and positioned to move in the tubular shape of the at least one stationary permanent semi-hard magnet, and wherein the at least one movable permanent hard magnet and the at least one stationary permanent semi-hard magnet have respective coercivities that are different from one another.

2. The electromechanical lock of claim 1, wherein the at least one stationary permanent semi-hard magnet is more easily demagnetizable than the at least one movable permanent hard magnet.

3. The electromechanical lock claim 1, wherein the first magnetization configuration of the at least one stationary permanent semi-hard magnet is arranged to move the at least one movable permanent magnet to the first position so that both ends of the pin remain mechanically uncoupled, so that the electromechanical lock remains in a locked state, and wherein the second magnetization configuration of the at least one stationary permanent semi-hard magnet is arranged to move the at least one movable permanent magnet to the second position so that one end of the pin becomes mechanically coupled and so as to change the electromechanical lock to an openable state.

4. The electromechanical lock of claim 1, wherein the at least one magnetization coil is operable to change the polarity of the at least one stationary permanent semi-hard magnet to cause the pin to move and hold its new position in a new magnetic field constellation created by the changed polarity.

5. The electromechanical lock of claim 1, wherein the electromechanical lock comprises:

first and second tubular shaped stationary permanent magnets;

a first movable permanent magnet placed inside a hollow of a first pin, and a second movable permanent magnet placed inside a hollow of a second pin, wherein at least a part of the first pin containing the first movable permanent magnet is controllable to move in the tubular shape of the first stationary permanent semi-hard magnet, and at least a part of the second pin containing the second movable permanent magnet is controllable to move in the tubular shape of the second stationary permanent semi-hard magnet.

6. The electromechanical lock of claim 5, wherein the first magnetization configuration of the first and the second stationary permanent semi-hard magnet is arranged to move the first movable permanent magnet to the first position so that both ends of the first pin remain mechanically uncoupled, and to move the second movable permanent magnet to the second position so that one end of the second pin becomes mechanically coupled so that the electromechanical lock remains in the locked state, and wherein the second magnetization configuration of the first and the second stationary permanent semi-hard magnet is arranged to move the first movable permanent magnet to the second position so that one end of the first pin becomes mechanically coupled, and to move the second movable permanent magnet to the first position so that both ends of the second pin remain mechanically uncoupled so as to change the electromechanical lock to the openable state.

7. The electromechanical lock of claim 5, wherein the electromechanical lock comprises a first magnetization coil operable to change the polarity of the first stationary permanent semi-hard magnet, and a second magnetization coil operable to change the polarity of the second stationary permanent semi-hard magnet to cause the first and the second pin to move and hold its new position in a new magnetic field constellation created by the changed polarity.

8. The electromechanical lock of claim 1, wherein both the at least one movable permanent hard magnet and the at least one stationary permanent semi-hard magnet are subjectable to the same magnetic flux from the at least one magnetization coil, with the at least one movable permanent hard magnet being formed from a first material preventing it from changing polarity and with the at least one stationary permanent semi-hard magnet being formed from a second material allowing its polarity to change.

9. The electromechanical lock of claim 1, wherein the at least one movable permanent hard magnet has a coercivity of 400-2800 kA/m and the at least one stationary permanent semi-hard magnet has a coercivity of 30-150 kA/m.

10. The electromechanical lock of claim 9, wherein the coercivity of the at least one movable permanent hard magnet is higher than the coercivity of the at least one stationary permanent semi-hard magnet.

11. A method of operating an electromechanical lock, the method comprising:

electrically switching a polarity of a stationary permanent semi-hard magnet between first and second magnetization configurations via an electrically powered magnetization coil that is positioned to surround the stationary permanent semi-hard magnet;

moving, by switching the stationary permanent semi-hard magnet to the first magnetization configuration, a movable permanent magnet to a first position;

moving, by switching the stationary permanent semi-hard magnet to the second magnetization configuration, the movable permanent hard magnet to a second position; and allowing the permanent magnet to move along a magnetic axis of the movable permanent magnet during the movement to the first and the second positions;

wherein the stationary permanent semi-hard magnet has a tubular shape, and the movable permanent magnet is placed inside a hollow in a pin, wherein a part of the pin containing the movable permanent magnet is clearance fitted and positioned to move in the tubular shape of the stationary permanent semi-hard magnet, and wherein the movable permanent hard magnet and the stationary permanent semi-hard magnet have respective coercivities that are different from one another.

12. The method of claim 11, wherein the stationary permanent semi-hard magnet is more easily demagnetizable than the movable permanent hard magnet.

13. The method of claim 11, wherein the first magnetization configuration of the stationary permanent semi-hard magnet is arranged to move the movable permanent magnet to the first position so that both ends of the pin remain mechanically uncoupled, so that the electromechanical lock remains in a locked state, and wherein the second magnetization configuration of the stationary permanent semi-hard magnet is arranged to move the movable permanent magnet to the second position so that one end of the pin becomes mechanically coupled and so as to change the electromechanical lock changes to an openable state.

14. The method of claim 11, wherein the magnetization coil is operable to change the polarity of the stationary permanent semi-hard magnet to cause the pin to move and hold its new position in a new magnetic field constellation created by the changed polarity.

15. The method claim 11, wherein the electromechanical lock comprises:

first and second tubular shaped stationary permanent magnets;

a first movable permanent magnet placed inside a hollow of a first pin, and a second movable permanent magnet placed inside a hollow of a second pin, wherein at least a part of the first pin containing the first movable permanent magnet is controllable to move in the tubular shape of the first stationary permanent semi-hard magnet, and at least a part of the second pin containing the second movable permanent magnet is controllable to move in the tubular shape of the second stationary permanent semi-hard magnet.

16. The method of claim 15, wherein the first magnetization configuration of the first and the second stationary permanent semi-hard magnet is arranged to move the first movable permanent magnet to the first position so that both ends of the first pin remain mechanically uncoupled, and to move the second movable permanent magnet to the second position so that one end of the second pin becomes mechanically coupled so that the electromechanical lock remains in the locked state, and wherein the second magnetization configuration of the first and the second stationary permanent semi-hard magnet is arranged to move the first movable permanent magnet to the second position so that one end of the first pin becomes mechanically coupled, and to move the second movable permanent magnet to the first position so that both ends of the second pin remain mechanically uncoupled so as to change the electromechanical lock to the openable state.

17. The method of claim 15, wherein the electromechanical lock comprises a first magnetization coil operable to change the polarity of the first stationary permanent semi-hard magnet, and a second magnetization coil operable to change the polarity of the second stationary permanent semi-hard magnet to cause the first and the second pin to move and hold its new position in a new magnetic field constellation created by the changed polarity.

18. The method of claim 11, wherein both the movable permanent hard magnet and the stationary permanent semi-hard magnet are subjectable to the same magnetic flux from the magnetization coil, with the movable permanent hard magnet being formed from a first material preventing it from changing polarity and with the stationary permanent semi-hard magnet being formed from a second material allowing its polarity to change.

19. The method of claim 11, wherein the movable permanent hard magnet has a coercivity of 400-2800 kA/m and the stationary permanent semi-hard magnet has a coercivity of 30-150 kA/m.

20. The method of claim 19, wherein the coercivity of the movable permanent hard magnet is higher than the coercivity of the stationary permanent semi-hard magnet.

21. The electromechanical lock of claim 1, wherein a length of the at least one stationary permanent semi-hard magnet is greater than a length of the at least one movable permanent hard magnet.

22. The electromechanical lock of claim 21, wherein one end of the pin comprises a broadened part to interact with a counterpart, and another end of the pin comprises the part containing the movable permanent magnet.

23. The electromechanical lock of claim 1, wherein one end of the pin comprises a broadened part to interact with a counterpart, and another end of the pin comprises the part containing the movable permanent magnet.

24. The method of claim 11, wherein a length of the at least one stationary permanent semi-hard magnet is greater than a length of the at least one movable permanent hard magnet.

25. The method of claim 24, wherein one end of the pin comprises a broadened part to interact with a counterpart, and another end of the pin comprises the part containing the movable permanent magnet.

26. The method of claim 11, wherein one end of the pin comprises a broadened part to interact with a counterpart, and another end of the pin comprises the part containing the movable permanent magnet.

* * * * *